United States Patent
Osinga et al.

(10) Patent No.: US 7,081,739 B2
(45) Date of Patent: Jul. 25, 2006

(54) VOLTAGE CONVERTING CIRCUIT HAVING PARALLEL CONNECTED SWITCHING DEVICES

(75) Inventors: Anne Jurjen Osinga, Rockanje (NL); Jochem Welvaadt, Amsterdam (NL)

(73) Assignee: True Solar Autonomy Holding B.V., Amsterdam (NL)

( * ) Notice: Subject to any disclaimer, the term of this patent is extended or adjusted under 35 U.S.C. 154(b) by 0 days.

(21) Appl. No.: 10/470,462

(22) PCT Filed: Jan. 30, 2002

(86) PCT No.: PCT/NL02/00069

§ 371 (c)(1),
(2), (4) Date: Jul. 29, 2003

(87) PCT Pub. No.: WO02/061929

PCT Pub. Date: Aug. 8, 2002

(65) Prior Publication Data

US 2004/0070380 A1  Apr. 15, 2004

(30) Foreign Application Priority Data

Jan. 30, 2001 (EP) .......................... 01300816

(51) Int. Cl.
*G05F 1/652* (2006.01)

(52) U.S. Cl. ........................ 323/222; 323/272
(58) Field of Classification Search ................ 323/222, 323/272, 271, 282
See application file for complete search history.

(56) References Cited

U.S. PATENT DOCUMENTS

| | | | |
|---|---|---|---|
| 4,445,055 A | 4/1984 | Bete | 307/571 |
| 4,755,739 A * | 7/1988 | Van Buul | 323/222 |
| 4,890,021 A | 12/1989 | Walker | 307/572 |

(Continued)

FOREIGN PATENT DOCUMENTS

| | | |
|---|---|---|
| EP | 0443155 | 8/1991 |
| EP | 0685921 | 12/1995 |
| JP | 3074169 | 3/1991 |
| JP | 4168972 | 6/1992 |
| JP | 2001251849 | 9/2001 |

*Primary Examiner*—Bao Q. Vu
(74) *Attorney, Agent, or Firm*—Kirkpatrick & Lockhart Nicholson Graham LLP

(57) ABSTRACT

The invention relates to a voltage converting circuit (2) having:—an input terminal (11) for connection to a varying voltage or current source, and an output terminal (12) with a supply voltage,—an inductive element (5) being with a first terminal connected to the input terminal and with a second terminal to a capacitive element (8) and to the output terminal (12), the capacitive element (8) being with one terminal connected to a reference voltage (9),—a first switch (6) being with a first terminal connected to the second terminal of the inductive element (5), and with a second terminal to the reference voltage (9), the first switch (6) comprising a gate electrode (31) for opening and closing of the switch when a control voltage of a first level is applied to the gate,—an oscillator (13) comprising a power input (14) connected to the output terminal (12), a start-up output (15) connected to the gate electrode (31) of the first switch (6) for supplying a pulse-like signal to the gate electrode (31) and an oscillator output (16), and—a second switch (7) connected in parallel with the first switch (6), the second switch having a gate electrode (32) connected to the oscillator output (16), wherein the first switch (6) remains opened when the supply voltage at the output terminal (12) reaches a predetermined level, and the second switch (7) is operated by the oscillator output (16) at a second voltage level that is higher than the first voltage level.

9 Claims, 4 Drawing Sheets

U.S. PATENT DOCUMENTS

| | | | |
|---|---|---|---|
| 5,418,704 A | * 5/1995 | Hua et al. | 323/282 |
| 5,621,620 A | 4/1997 | Machida et al. | 363/16 |
| 5,659,241 A | 8/1997 | Horiuchi et al. | 323/222 |
| 5,691,627 A | * 11/1997 | Shum | 323/222 |
| 5,691,632 A | 11/1997 | Otake | 323/282 |
| 5,825,163 A | 10/1998 | Pontarollo | 323/222 |
| 5,861,734 A | * 1/1999 | Fasullo et al. | 323/222 |
| 6,522,113 B1 | * 2/2003 | Betten | 323/282 |
| 6,525,513 B1 | * 2/2003 | Zhao | 323/222 |

* cited by examiner

VOLTAGE CONVERTING CIRCUIT HAVING PARALLEL CONNECTED SWITCHING DEVICES

The invention relates to a voltage converting circuit that can be connected to a varying voltage or current source generating a small and varying input voltage, which is self-starting and which generates an increased supply voltage.

U.S. Pat. No. 5,659,241 discloses a voltage converting circuit having:
- an input terminal for connection to a varying voltage or current source, and an output terminal with a supply voltage;
- an inductive element being with a first terminal connected to the input terminal and with a second terminal to a capacitive element and to the output terminal, the capacitive element being with one terminal connected to a reference voltage;
- a first switch being with a first terminal connected to the second terminal of the inductive element, arid with a second terminal to the reference voltage, the first switch comprising a first gate electrode for opening and closing of the first switch when a control voltage of a first level is applied to the first gate electrode.
- a first oscillator comprising a power input connected to the output terminal, a start-up output connected to the first gate electrode of the first switch for supplying a pulse-like signal to the first gate electrode and an oscillator output, and
- a second switch connected in parallel with the first switch, the second switch having a second gate electrode connected to the oscillator output, the first switch remaining opened when the supply voltage at the output terminal reaches a predetermined level, and the second switch is operated by the oscillator output at a second voltage level that is higher than the first voltage level. This known voltage converting circuit is a DC/DC converter that converts a lower DC voltage to a higher DC voltage. The lower voltage is indicated to be about 1.5V. The higher voltage is indicated ti be in the order of about 3V–5V. The first switch, that may be a bipolar transistor, operates the DC/DC converter at the beginning when the output voltage has not reached its high end level. When the output voltage reaches a predetermined limit, the converter is operated by the second switch, that may be a MOS transistor. Similar converter circuit designs may be derived from JP-A-3 074 169 and EP-A-A-685 921.

The invention relates in particular to a DC—DC step-up converter, which can be operated in particular at low voltages generated by a solar cell and which can be used to convert relatively small voltages, such as voltages below 1 V, in particular below 0.5V to DC-voltages between 1–20V for charging a battery or for operating an electrical device.

It is therefore an object of the present invention to provide a DC—DC step-up converter operating at low input voltages, which is self-starting and which uses a relatively small number of components.

It is a further object of the present invention to provide a step-up converter, in which power losses are minimised and which is of a compact design.

It is still a further object of the present invention to provide a DC—DC step-up converter, which can operate at or near the maximum power point of a solar cell.

Hereto, the voltage converting circuit according to the present invention comprises a voltage converting circuit (2) having: an input terminal (4) for connecting to a varying voltage or current source, and an output terminal (12) with a supply voltage, an inductive element (5) being with a first terminal connected to the input terminal and with a second terminal to a capacitive element (8) and to the output terminal (12), the capacitive element (8) being with one terminal connected to a reference voltage (9), a first switch (6) being with a first terminal connected to the second terminal of the inductive element (5), and with a second terminal to the reference voltage (9), the first switch (6) comprising a first gate electrode (31) for opening and closing of the first switch when a control voltage of a first level is applied to the first gate electrode (31);

a first oscillator (13) comprising a power input (14) connected to the output terminal (12), a start-up output (15) connected to the first gate electrode (31) of the first switch (6) for supplying a pulse-like signal to the first gate electrode (31) and an oscillator output (16), and a second switch (7) connected in parallel with the first switch (6), the second switch having a second gate electrode (32) connected to the oscillator output (16), the first switch (6) remaining opened when the supply voltage at the output terminal (12) reaches a predetermined level, and the second switch (7) is operated by the oscillator output (16) at a second voltage level that is higher than the first voltage level, characterized in that the first oscillator (13) comprises low voltage inverter ports able to generate output voltages for said start-up output (15) when said power input (14) receives an input voltage of below 0.4 V and that a clamp diode ($D_4$) is connected between the second terminal of the inductive element (5) and the first gate electrode (31).

This known voltage converting circuit is a DC/DC converter that converts a lower DC voltage to a higher DC voltage. The lower voltage is indicated to be about 1.5V. The higher voltage is indicated to be in the order of about 3V–5V. The first switch, that may be a bipolar transistor, operates the DC/DC converter at the beginning when the output voltage has not reached its high end level. When the output voltage reaches a predetermined limit, the converter is operated by the second switch, that may be a MOS transistor. Similar converter circuit designs may be derived from JP-A-3 074 169 and EP-A-685 921.

The varying input voltage is fed into the inductive element, which is periodically connected to reference voltage by opening of the first switch under control of the start-up output of the oscillator. The power input of the oscillator is connected to the supply voltage terminal, which at start-up receives a very small voltage. The resulting start-up output voltage is correspondingly small, for instance 0.2 V or less. When the first switch is opened and closed again, a rising current is generated in the inductive element, which charges the capacitive element such that the supply voltage is successively increased. The first switch is particularly suited to be operated at a low gate control voltage from the start-up output of the oscillator. As the supply voltage increases, the start-up output signal of the oscillator will increase, resulting in better operation of the first switch and more power being transferred from the inductive element to the capacitive element, such that a self-amplifying effect results in increasing the supply voltage and the oscillator start-up output signal. When the supply voltage reaches a predetermined value, the first switch is de-activated (opened) and the second switch is operated from a second oscillator output, at a gate control voltage, which is above the gate control voltage of the first switch. Operation of the second switch results in a further increase in the supply voltage. The first switch may for instance be formed by a bipolar pnp-transistor with a gate control voltage of 0.6V above reference voltage, a collector-emitter voltage Vce of 600 mV at a collector current Ic of 100 mA. The second switch may be formed by a low power logic level MOSFET with a gate control voltage Vgs (gate treshold voltage) generally in the range of 1–2V at a source voltage Vds of 2V and at a current Ids of 0.3–1.2A.

By the use of the two switches according to the present invention, each operating at a different gate control voltage level, a self-starting step-up converter is achieved.

A clamping a diode is connected between the second terminal of the inductive element at the gate electrode of the first switch. When a varying supply voltage of about 0.4V is offered to the input terminal, and the supply voltage is about 0.4V, a 0.4V bias voltage on the control terminal of the first switch is maintained by the positive clamp formed by the diode. Hence, in case the first switch is formed by a pnp bipolar transistor, only a 0.2V varying control voltage is necessary at the gate to bring the transistor into conduction. The 0.2V varying voltage is obtained from the oscillator when powered at its input by a 0.4V supply voltage level.

In a further embodiment, the outputs of the oscillator are connected to the gates via respective capacitive elements. By the capacitive element coupling, the small DC control voltage from the start-up output of the oscillator is added to the 0.4V DC level of the diode clamp.

A voltage converting unit may be formed by attaching a second converting stage to the voltage converting circuit, the second converting stage having an inductive element with a first terminal connectable to the varying voltage source, and connected with a second terminal to a first terminal of an electrical element such as an accumulator, the accumulator being with a second terminal connected to the reference voltage, a third switch being connected between the second terminal of the inductive element and the reference voltage and being with a gate electrode connected to an oscillator output of a second oscillator, the supply voltage of the output terminal of the voltage converting circuit being connected to the second terminal of the inductive element and to a power input of the second oscillator. The third switch may be formed by a power MOSFET having multiple drains and multiple sources for further converting the DC-voltage from the converting circuit to levels of between 3–15V.

The voltage converting circuit according to the present invention may be applied in combination with a solar cell as a power source, a fuel cell or other varying voltage or current sources having relatively small current and voltages at their output The voltage-converting unit according to the present invention may be part of a cattle watering unit, country road lighting or an electrical fence in the countryside when as a voltage source a solar cell is used. Other applications in combination with a solar cell are digital billboards, billboard lighting, street lighting or information points.

Furthermore, the device of the present invention can be used to power speed control devices along roads, roadside reflectors or road markings (cat eyes), emergency points etc.

Alternatively, the voltage converting circuit can be applied in marine applications as a generator on boats, for boat lighting, as a navigation device or a GPS-system.

Mobile phones, laptops, organisers, and other appliances may be powered by the voltage converting circuit which only needs a very small voltage input.

Furthermore, digital cameras, battery chargers, bicycle lighting, danger triangles, avalanche beepers, flashlight, tv's, microwaves and other domestic appliances, garden lighting, garden sprayers and light regulating devices for windows, such as window blinds, awnings and etc. may be powered by the voltage converting circuit of the present invention.

The invention is most beneficial to small seized appliances by allowing a substantial reduction in surface of the solar cells.

Some embodiments of a voltage-converting unit according to the present invention will be explained in detail with reference to the accompanying drawings. In the drawings:

FIG. 1 schematically shows an assembly of a voltage converting circuit according to the present invention in combination with a DC—DC step-up voltage converter connected to an electrical device;

Figure 1:
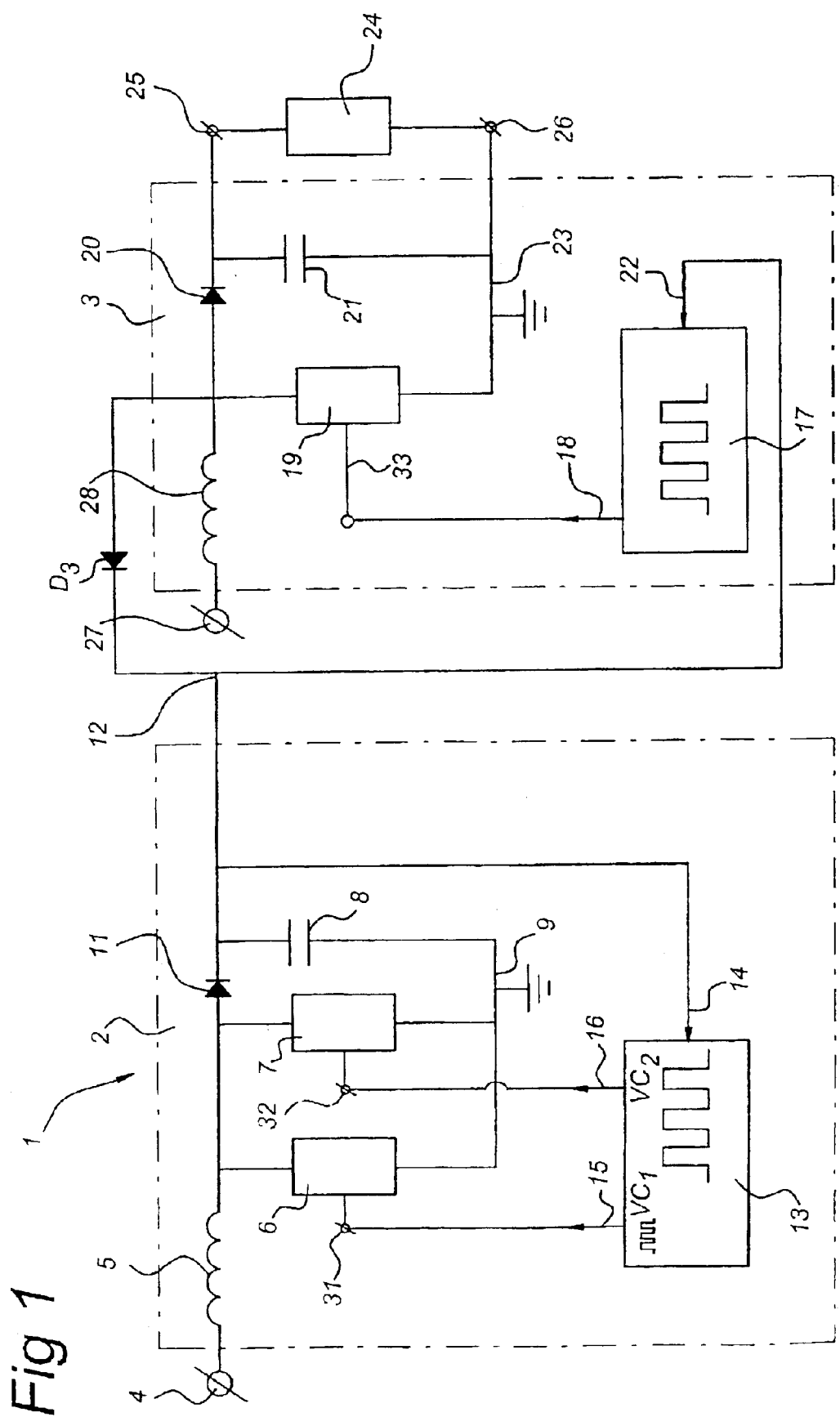

FIG. 1 shows a voltage converting unit 1 having a voltage converting circuit, or low voltage converter stage 2, connected to a second converter stage 3. The low voltage converter stage 2 comprises an input terminal 4, an inductive element 5, first and second switches 6, 7 and a capacitive element such as a capacitor 8. Switches 6 and 7 are with a first terminal connected to the inductive element 5 and with a second terminal to a reference voltage line 9. The second terminal of capacitive element 8 is connected to the output of a diode 11 and to the supply voltage terminal 12. The supply voltage terminal 12 is connected to a power input 14 of a joint oscillator 13. A start-up output 15 of the oscillator 13 is connected to the gate electrode 31 of switch 6 whereas the oscillator output 16 is connected to the gate electrode 32 of switch 7. The supply voltage terminal 12 of low voltage converter stage 2 is connected to the second terminal of inductive element 28 and to a power input 22 of oscillator 17 of second converter stage 3. The oscillator output 18 connects to the gate electrode 33 of switch 19. A diode 20 and a capacitive element such as a capacitor 21 are connected between the inductive element 15 and reference voltage line 23. Electrical device 24 is connected across output terminals 25, 26 of second converter stage 3.

When at start-up a varying low voltage supply, such as a solar cell, is connected to input terminals 4 and 27 of the voltage converting unit 1, and switches 6, 7 are closed, the capacitive element 8 is charged, creating a small voltage on the output terminal 12 and on oscillator power input 14. The small power input into the joint oscillator 13, results in a pulse shaped signal on start-up output 15 at a low gate control voltage level $V_{c1}$, which may be a few tenths of Volts, periodically opening and closing the switch 6 at the frequency of for instance 100 kHz. This causes a periodic current through the switch 6 resulting in a rising current through the inductive element 5, charging capacitor 8 that is rectified by diode 11 and results in an increasing voltage at the supply voltage terminal 12 and consequently at the power input 14 of the joint oscillator 13. This effect continues until the voltage level at supply terminal 12 reaches a predetermined level, after which low voltage controlled switch 6 is de-activated (opened) and high voltage controlled switch 7 is operated from oscillator output 16. The second switch 7 is operated at a control voltage level. $V_{c2}$ until the supply voltage at supply voltage terminal 12 is for instance a few volts. The supply voltage is input into second converter stage 3 at the second terminal of inductive element 28 and into power input 22 of second oscillator 17. At oscillator output 18, a pulsed control signal operating the gate electrode 33 of switch 19 is generated. By switching on and off the switch 19, the energy stored in inductive element 28 is transferred to capacitor 21 until a predetermined voltage level is reached. At this predetermined level, such as voltage levels between 1.5–12V, switch 19 is opened such that electrical energy is stored in inductive element 28, to be released again upon closing of the switch 19.

As the step-up voltage-converting unit 1 generates its own supply voltage from a situation of rest, the step-up converter is self-starting.

Figure 2:
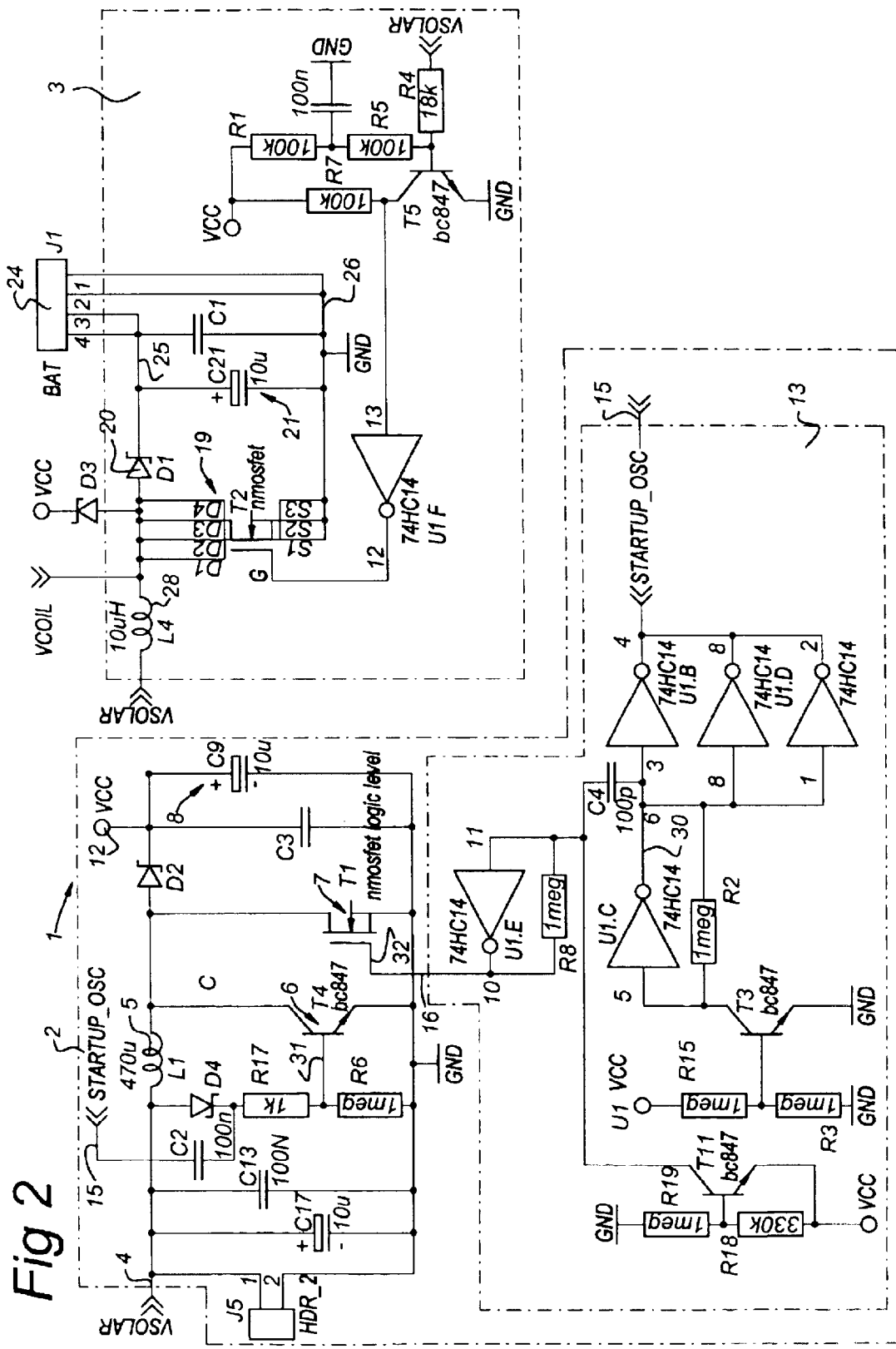
FIG. 2 shows in detail the components of the voltage converting circuit and DC-DC converter of FIG. 1.

FIG. 2 shows in detail the components of the voltage converter stage 2 and second converter stage 3 according to the present invention. The following letter symbols apply:

$T_1$: low power, logic level MOSFET;
$T_2$: switching MOSFET; power MOSFET;
$L_1$: switching coil with high inductance;
$L_4$: switching coil;
$D_1$, $D_2$: rectifying diodes;
$C_9$, $C_{21}$, $C_1$: smoothening electrically controllable capacitors (electrolytic capacitor);
$U_{1A}$–$U_{1F}$; $U_{1C}$: low voltage inverter gates manufactured by Philips Electronics under type number 74LV14;
$T_4$: switching bipolar transistor;
$D_2$, $D_4$: Schottky diodes;
$C_3$: relatively small capacitor.

The second converter stage 3 operates according to known DC—DC voltage converter principles according to which the small fluctuating voltage V-solar at the input of coil 28 is stored in the coil when switching MOSFET 19 is opened. Upon closing of the switching MOSFET 19, the energy is released from the coil 28 and supplied via rectifier diode 20 to smoothing capacitors 21 resulting in an increased voltage across output terminals 25, 26. In order to be self-starting, voltage converter circuit or step-up circuit 2 is provided wherein the oscillator 13 is conducted of active component of the type of Philips low voltage inverter ports $U_{1C}$ and $U_{1E}$. The inverter ports can generate at their output voltages at an input voltage of V of below 0.4V at start-up.

At low supply voltages $V_{cc}$, transistor $T_3$ is switched-off and a very low alternating voltage is supplied via start-up output 15 of oscillator 13 to a coupling capacitor $C_2$ and from thereon to the base 31 of transistor $T_4$. Schottky diode $D_4$ is used as a positive clamp such that a small alternating voltage appears on the base 31 with an offset of 0.4V. The solar cell voltage is about 0.4V. The transistor $T_4$ will go in conduction at a gate voltage of about 0.6V, such that the gate voltage need only be 0.2 V in order to get transistor $T_4$ into conduction. It has appeared that the oscillating inverter gate $U_{1C}$ of oscillator 13 can supply enough energy to get the transistor $T_4$ into conduction. This causes a periodic current in the collector c of transistor $T_4$. Since the transistor $T_4$ is coupled with a switching coil with a relatively high inductance $L_1$ and a relatively small capacitor $C_3$, the periodic current in the collector c results in an AC-voltage across the coil 5. This AC-voltage is rectified through Schottky diode $D_2$ and appears on supply voltage terminal 12 and is fed back at the supply of low voltage inverter gates $U_{1C}$–$U_{1F}$. Each time $V_{cc}$ rises, the voltage level at the start-up output 15 of the oscillator 13 rises, resulting in better control of switching transistor $T_4$. Proper gating of transistor $T_4$ results in more power being stored in coil 5, increasing supply terminal voltage $V_{cc}$ etc. At the outlet 30 of the oscillator $U_{1C}$, a coupling capacitor $C_4$ is provided which operates a low voltage inverter gate $U_{1E}$. The output of the oscillator $U_{1E}$ is connected to the control gate 32 of a low power logic level of the MOSFET $T_1$. The coupling capacitor $C_4$ ensures that the MOSFET of $T_1$ switches at the beginning or start-up in phase with transistor $T_4$.

When the supply voltage $V_{cc}$ rises above the treshold level of logic level MOSFET $T_1$, transistor $T_3$ goes into conduction, pulling the input of oscillator $U_{1C}$ to ground such that first transistor $T_4$ is switched-off and logic level MOSFET $T_1$ takes over. Now $V_{cc}$ can rise to for instance 3 V wherein the final power conversion up to voltages ranging from 1.5–12.0 V is effected by power MOSFET $T_2$ of second converter stage 3. When $V_{cc}$ reaches its desired end level, the varying supply level V-solar will place transistor $T_5$ in conduction pulling the input of oscillator $U_{1F}$ to ground and de-activating switch $T_2$.

Figure 3:
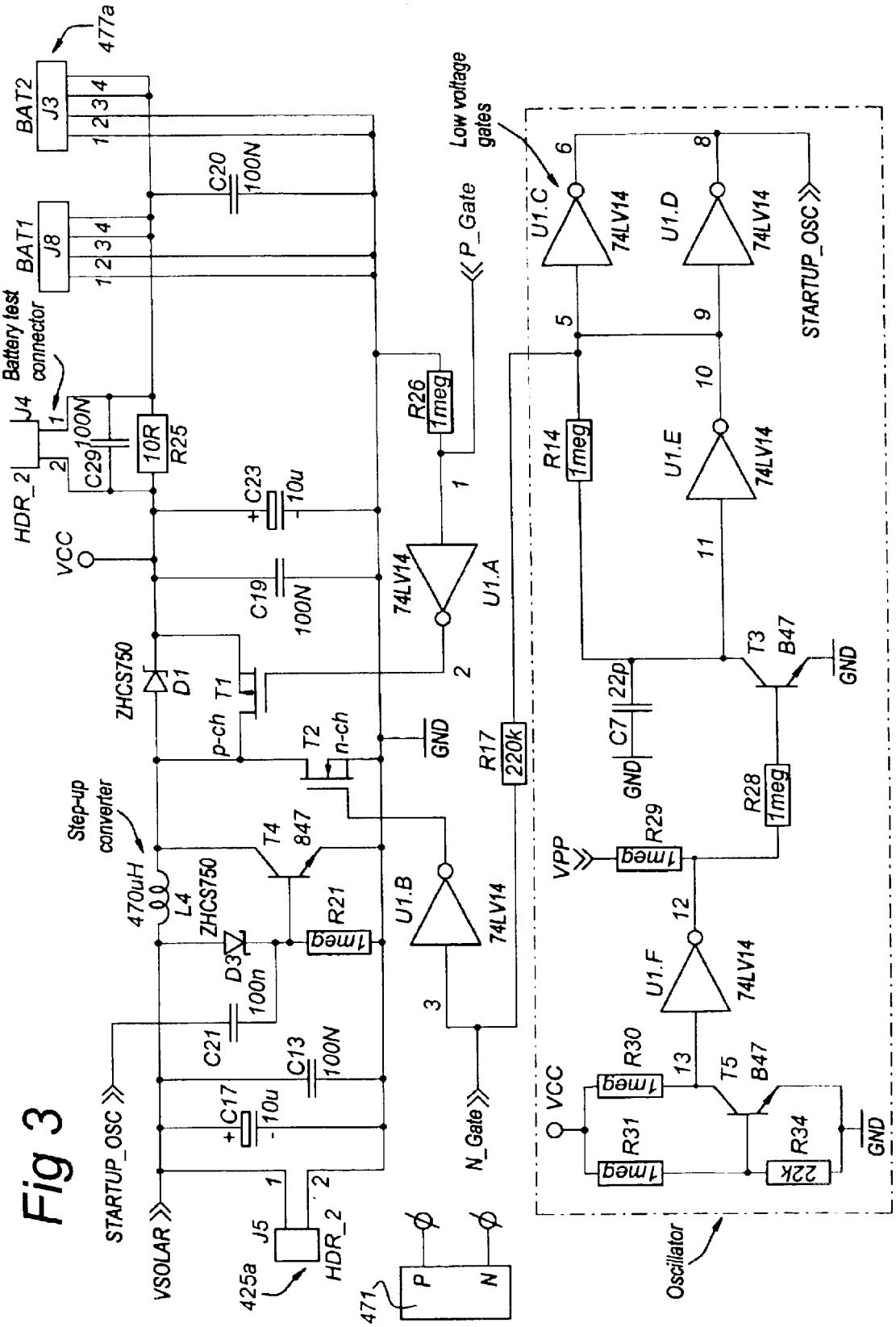
FIG. 3 shows an alternative embodiment of a voltage converting circuit according to the present invention wherein the second switch is controlled by a microprocessor.

FIG. 3 shows another embodiment of a low voltage-solar converter including a step-up DC—DC converter (sometime also called: a voltage increasing chopper). The main components of the step-up converter are:

inductor/inductance $L_4$; semiconductor switch $T_4$ and supplemental N-channel MOSFET $T_2$; diode $D_1$ (Schottky ZHCS 750) and capacitor/capacitance in the form of high capacity elco $C_{23}$ compensated for low resistance by additional capacitors $C_{19}$ and $C_{20}$. Semiconductor switch $T_4$ operates the step-up converter at those times when the voltage is too low to operate the MOSFET switch $T_2$. Switch $T_4$ is operated by an oscillator circuit as indicated in FIG. 3 by a dash-dotted box. The output of the oscillator connects to the start-up oscillator connector of the step-up converter where Schottky diode $D_3$ (ZHCS 750) adds the output voltage of the solar panel 425a to the pulsed voltage generated by the oscillator. The resulting voltage is offered to the base of $T_4$. As soon as the voltage offered to the step-up converter is high enough for the MOSFET switch $T_2$ to operate, the oscillator output is grounded through semiconductor $T_3$ of the oscillator circuit. Then the MOSFET T2 is controlled from the "N-gate" output of the central micro processor 471 and a further P-channel MOSFET T1 is controlled from the "P-gate" output of the processor 471 to take over from the Schottky diode $D_1$. The P and N-gates of the processor 471 are software driven. In this manner a particularly advantageous step-up converter has been obtained. The alternative use of semiconductor switches $T_4$ and $T_2$ provides for a register pf compound step-up converter that has optimal characteristics for each of a low voltage and a higher voltage range. The provision of Schottky diode $D_3$ enables to offer an as high as possible voltage to the base of the low voltage semiconductor switch $T_4$. The additional MOSFET switch $T_1$, which is positioned in parallel to diode $D_1$, allows to eliminate the losses, which normally occur in diodes such as $D_1$.

Figure 4:
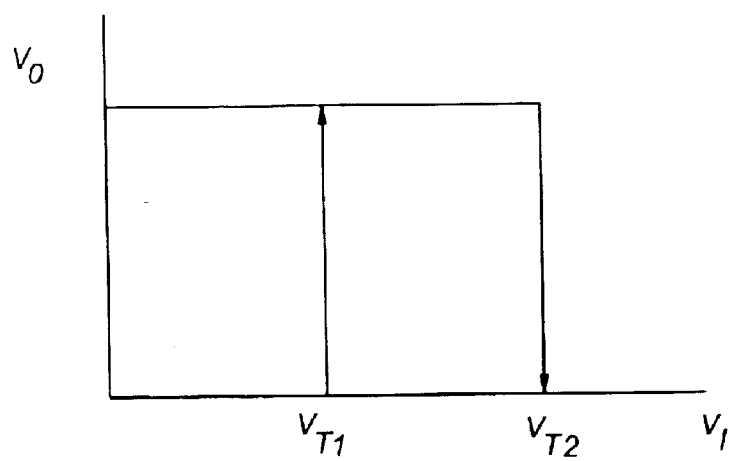
FIG. 4 shows a schematic diagram of the input and output voltages of the inverters $U_{1C}$ and $U_{1E}$.
Figure 5:
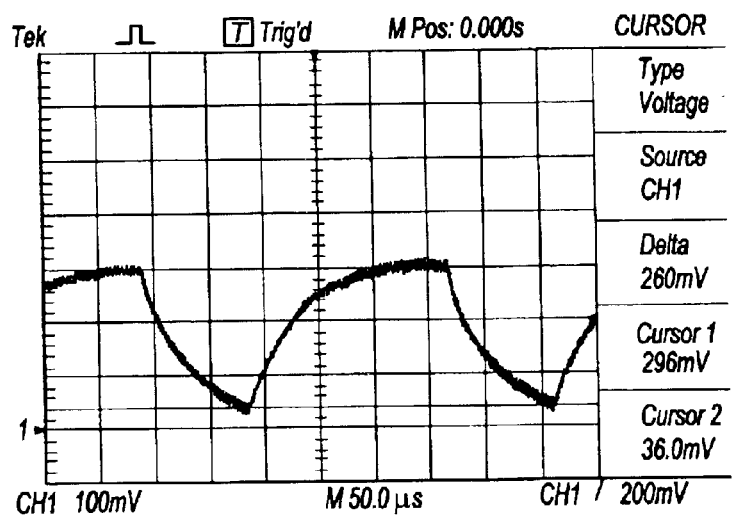
FIG. 5 shows an input voltage of inverter $U_{1C}$ during start-up.

FIG. 4 shows the input and output voltages $V_1$, $V_0$ of inverter ports $U_{1C}$ and $U_{1E}$, which are inverting Schmitt-trigger inverter ports. Generally, at a supply voltage $V_{cc}$ of 1V, the negative-going threshold $V_{T1}$ will be about 0.5V, the positive-going threshold $V_{T2}$ being several tenths of Volts higher. The output voltage $V_0$ will be limited to a maximum of supply voltage $V_{cc}$. The inventors have found out that at supply voltages $V_{cc}$ below specification of the manufacturer, there is a region of the inverter port below $V_{T1}$ at which at low supply voltage $V_{cc}$ there still is a hysteries in the output signal such that an oscillator can be obtained by feedback of in the output signal to the input via resistor $R_2$. At a supply voltage $V_{cc}$ of 0.4V, the input at the inverter gate $U_{1C}$ is given in FIG. 5, at a level of about 300 mV, at a frequency of about 4 kHz.

Figure 6:
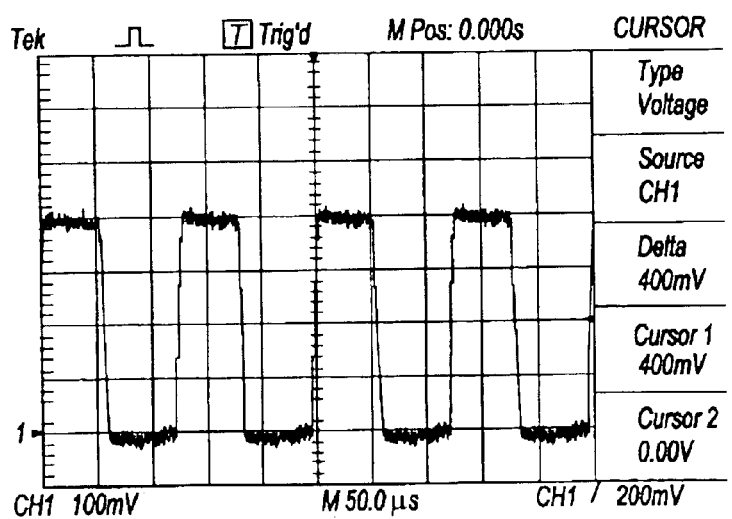
FIG. 6 shows an output voltage of inverter $U_{1C}$ inverter during start-up.

In FIG. 6, the output at inverter gate $U_{1C}$ is given at a level of 400 mV with a frequency of about 20 kHz. Surprisingly, at low supply voltages $V_{cc}$ and at low input levels below the negative-going treshold $V_{T1}$ according to specifications, it is still possible to obtain all oscillator using inverter gate $U_{1C}$ such that start-up of the step-up converter can be obtained by use of said component.

What is claimed is:

1. Voltage converting circuit (2) having:
   an input terminal (4) for connecting to a varying voltage or current source, and an output terminal (12) with a supply voltage,
   an inductive element (5) being with a first terminal connected to the input terminal and with a second terminal to a capacitive element (8) and to the output terminal (12), the capacitive element (8) being with one terminal connected to a reference voltage (9),
   a first switch (6) being with a first terminal connected to the second terminal of the inductive element (5), and with a second terminal to the reference voltage (9), the first switch (6) comprising a first gate electrode (31) for opening and closing of the first switch when a control voltage of a first level is applied to the first gate electrode (31);
   a first oscillator (13) comprising a power input (14) connected to the output terminal (12), a start-up output (15) connected to the first gate electrode (31) of the first switch (6) for supplying a pulse-like signal to the first gate electrode (31) and an oscillator output (16), and
   a second switch (7) connected in parallel with the first switch (6), the second switch having a second gate electrode (32) connected to the oscillator output (16), the first switch (6) remaining opened when the supply voltage at the output terminal (12) reaches a predetermined level, and the second switch (7) is operated by the oscillator output (16) at a second voltage level that is higher than the first voltage level, characterized in that the first oscillator (13) comprises low voltage inverter ports able to generate output voltages for said start-up output (15) when said power input (14) receives an input voltage of below 0.4 V and that a clamp diode ($D_4$) is connected between the second terminal of the inductive element (5) and the first gate electrode (31).

2. Voltage converting circuit (2) according to claim 1, wherein the first switch (6) comprises a bipolar transistor ($T_4$) and the second switch (7) comprises a Field Effect Transistor ($T_1$).

3. Voltage converting circuit (2) according to claim 1, wherein the output (15) of the oscillator (13) is connected to the first gate electrode (31) via a respective capacitive element ($C^2$).

4. Voltage converting circuit (2) according to claim 2, wherein the output (15) of the oscillator (13) is connected to the first gate electrode (31) via a respective capacitive K element ($C^2$).

5. Voltage converting unit (1) comprising a voltage converting circuit (2) according to claim 1, wherein a second converting stage (3) is provided having an inductive element (28) with a first terminal connectable to the varying voltage source, and connectable with a second terminal to a first terminal (25) of an electrical element (24) such as an accumulator, the electrical element (24) being with a second terminal (26) connected to the reference voltage (23), a third switch (19) being connected between the second terminal of the inductive element (28) and the reference voltage (23) and being with a gate electrode (33) connected to an oscillator output (18) of a second oscillator (17), the output terminal (12) of the voltage converting circuit (2) being connected to the second terminal of the inductive element (28) of the second converting stage (3) and to a power input (22) of the second oscillator (17).

6. Voltage converting unit (1), according to claim 5, the third switch (19) comprising a MOSFET with multiple drains and multiple sources.

7. Voltage converting unit (1) according to claim 5, wherein the second inductive element (28) is with its second terminal connected to the electrical element (24) via a diode (20), the first terminal of the electrical element (24) being connected via a capacitive element (21) to the reference voltage (23).

8. Voltage converting unit (1) according to claim 6, wherein the second inductive element (28) is with its second terminal connected to the electrical element (24) via a diode (20), the first terminal of the electrical element (24) being connected via a capacitive element (21) to the reference voltage (23).

9. Voltage converting circuit (2) having:
   an input terminal (4) for connecting to a varying voltage or current source, and an output terminal (12) with a supply voltage,
   an inductive element (5) being with a first terminal connected to the input terminal and with a second terminal to a capacitive element (8) and to the output terminal (12), the capacitive element (8) being with one terminal connected to a reference voltage (9),
   a first switch (6) being with a first terminal connected to the second terminal of the inductive element (5), and with a second terminal to the reference voltage (9), the first switch (6) comprising a first gate electrode (31) and an oscillator oupput (16), and
   a second switch (7) connected in parallel with the first switch (6), the second switch having a second gate electrode (32) connected to the oscillator output (16), the first switch (6) remaining opened when the supply voltage at the output terminal (12) reaches a predetermined level, and the second switch (7) is operated by the oscillator output (16) at a second voltage level that is higher than the first voltage level, characterized in that
   the first oscillator (13) comprises low voltage inverter ports able to generate output voltages for said start-up output (15) when said power input (14) receives an input voltage of below 0.4 V and that the voltage converting circuit comprises a clamp (D3/D4) arranged to add said pulse-like signal at said start-up output (15) to said varying voltage or current source resulting in an added voltage, which added voltage, which added voltage is suppled to the first gate electrode (31) of the first switch (6).

* * * * *

UNITED STATES PATENT AND TRADEMARK OFFICE
CERTIFICATE OF CORRECTION

PATENT NO. : 7,081,739 B2  Page 1 of 1
APPLICATION NO. : 10/470462
DATED : July 25, 2006
INVENTOR(S) : Osinga et al.

It is certified that error appears in the above-identified patent and that said Letters Patent is hereby corrected as shown below:

In column 8, line 59, "which added voltage," is deleted.

In column 8, line 60, "suppled" should read --supplied--.

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,081,739 B2  Page 1 of 1
APPLICATION NO. : 10/470462
DATED : July 25, 2006
INVENTOR(S) : Osinga et al.

It is certified that error appears in the above-identified patent and that said Letters Patent is hereby corrected as shown below:

In column 7, line 45, "second" should read --first--.

Signed and Sealed this

Thirteenth Day of January, 2009

JON W. DUDAS
*Director of the United States Patent and Trademark Office*